UNITED STATES PATENT OFFICE.

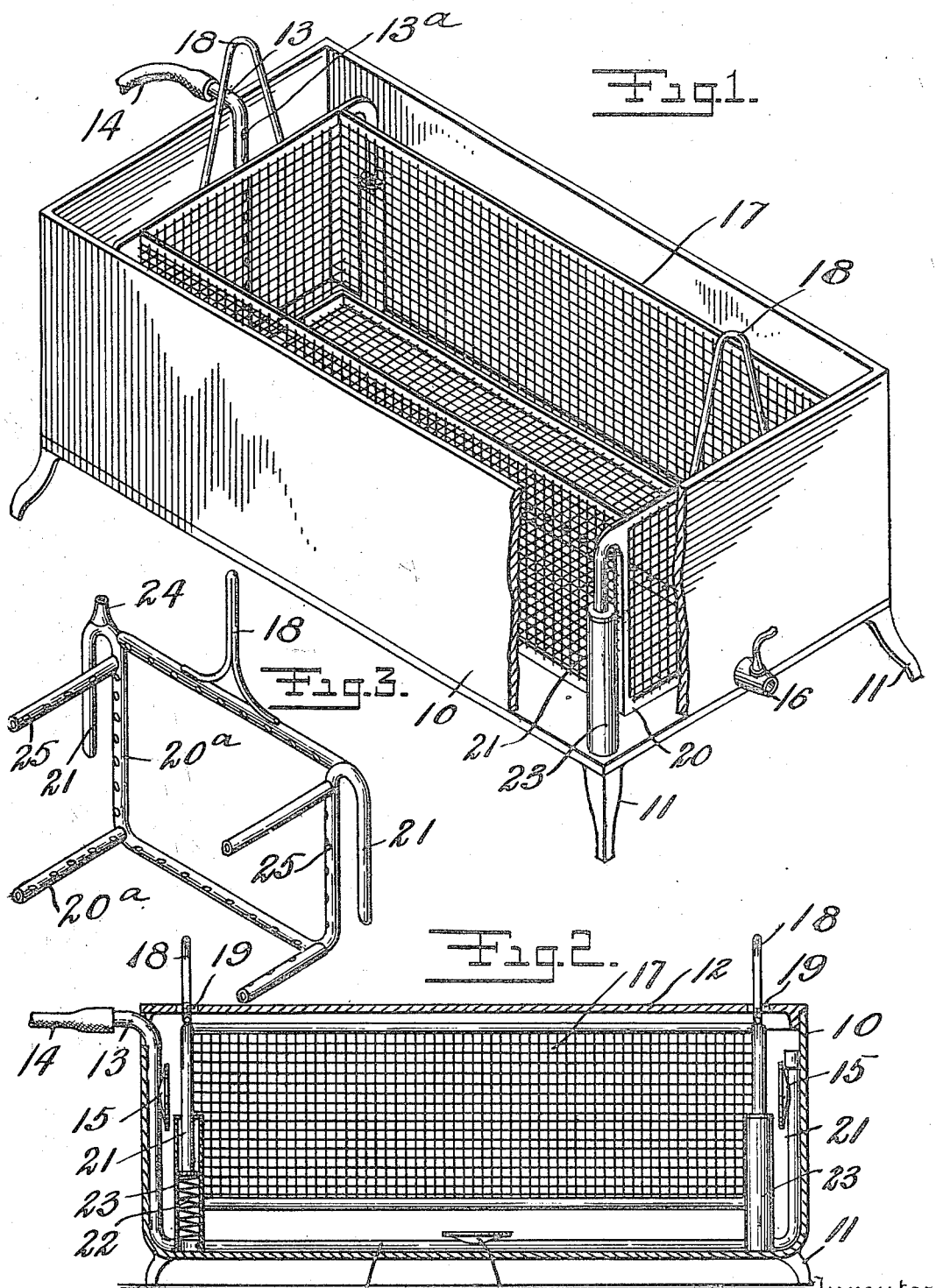

LOUIS F. CLAUSS, OF ELIZABETH, NEW JERSEY.

DISH-WASHER.

1,209,263.

Specification of Letters Patent.

Patented Dec. 19, 1916.

Application filed July 12, 1916. Serial No. 108,781.

*To all whom it may concern:*

Be it known that I, LOUIS F. CLAUSS, a citizen of the United States, and a resident of Elizabeth, county of Union, and State of New Jersey, have invented a new and useful Improvement in Dish-Washers, of which the following is a full, clear, and exact description.

My invention relates to improvements in dish washing machines, and the principal object of my invention is to produce a very simple, inexpensive and efficient machine by which dishes can be thoroughly and quickly washed.

Another object of my invention is to produce a machine in which the dishes are held resiliently so that they are not likely to be broken, and to provide means by which the basket containing the dishes can be moved up and down in the water so as to cause sufficient agitation to assist in thoroughly cleaning them. Machines of this character have frequently been made in rather large units and of rather a complicated nature for hotel and restaurant use, but my machine while adapted for such use, is especially intended to provide a cheap and efficient machine for family use.

My invention is also intended to produce a machine having an open-work basket containing the dishes, which can be placed in a tank, and in which the framework of the basket is provided with piston arms working against spring supports so that the dishes are held resiliently as stated, and so that the basket can have a guided movement up and down in the tank.

My invention is also intended to provide an efficient and simple means by which the dishes can be first washed and the dish water withdrawn, and afterward clean hot water squirted or sprinkled through the basket so as to thoroughly cleanse the dishes. All of which will be clearly understood from the description which follows.

Reference is to be had to the accompanying drawings forming a part of this specification, in which similar reference characters indicate corresponding parts in all the views.

Figure 1 is a broken perspective view of the machine embodying my invention, with the cover removed from the tank. Fig. 2 is a longitudinal section of the machine, and Fig. 3 is a broken perspective view of a modified form of basket frame.

The machine has a tank 10 which is open at the top and which can be of any desired shape. I have shown it provided with legs 11, but if desired the legs can be omitted so that the tank may have a flat bottom and be adapted to sit on a stove or over a fire so that the water can be heated in it in cases where hot water is not available at the sink or other place where the machine is used. The tank has a removable top 12 and is provided with a pipe 13 which enters at the top of the tank and preferably at one end, and follows the contour of the tank to the opposite end of the machine, and the pipe has preferably a hose connection 14, although any suitable connection can be used for connecting the pipe 13 with a hot water supply. The pipe 13 is also preferably provided with a series of sprinkling roses 15 located at the ends and bottom of the tank, and as many of these can be used as is desirable, the purpose of which is to squirt hot water through the basket within the tank and thus dislodge any material sticking to the dishes. The pipe can be provided with perforations $13^a$ also, so that the water can be squirted through these if desired.

Within the tank and removable from it, is an openwork basket 17 which can be most economically made of wire, and this is provided with handles 18 at the ends which project upward through holes 19 in the lid or cover 12 so that when the basket is within the tank and the latter is partly filled with water, one can grasp the handles and move the basket up and down, thus keeping the water agitated and bringing it into efficient contact with the surfaces of the dishes. The basket is provided with a suitable framework 20, and this has at the ends and at opposite sides, downwardly extending arms 21 which serve as pistons, and which rest upon springs 22 in the spring cases 23, these being located near the corners of the tank and preferably on the bottom thereof. It will be seen that this arrangement of the arms 21 and casings 23 also serves to guide the basket accurately and thus lessens the liability of breaking dishes. Thus it will be seen that the basket is supported in a very easy and resilient way, and the dishes are not violently disturbed while the basket can be moved up and down as previously described.

If desired the framework can be made tubular as shown in Fig. 3, provided with a water connection 24 at the upper part and at one end, and this tubular frame can be provided at necessary or desirable parts with perforations 25 so that the water can be admitted to the tank through the frame and squirted through all parts of the basket.

It will be seen that the arrangement shown is of the utmost simplicity and provides for a cheap easily operated machine. In operation if the dishes are greasy or much soiled, they are placed in the basket, the basket placed in the tank, the latter covered, the hot water turned on and the dishes soused up and down as described, after which the water can be withdrawn from the drain cock 16 (see Fig. 1) at one end of the tank. This cock can of course be located in any desirable place. After the soiled water has been withdrawn fresh hot water can be again turned on and the dishes thoroughly rinsed. If the dishes are very much soiled this operation can be repeated until the dishes are thoroughly cleaned. I find that in using hot clean water for rinsing them at the last operation, the dishes can then be removed and will dry themselves nicely without the use of a towel or the like.

I claim:—

1. A dish washer comprising a tank having spring casings therein, springs within the casings, and an openwork dish holding basket fitting within the tank and having vertically arranged side arms which enter the casings and rest upon the springs.

2. A dish washer comprising a tank, an open work dish holding basket fitting within the tank, arms connected with the upper part of the basket and extending vertically downward essentially parallel with the basket sides, and springs held within the tank to support the aforesaid arms.

3. A dish washer comprising a tank having a cover, a water supply pipe leading into the tank and lying against the wall thereof, an open work dish holding basket held within the tank and having handles projecting up through the cover, arms vertically arranged and connected at their upper parts with the frame of the basket, and springs supporting the said arms.

LOUIS F. CLAUSS.

Witnesses:
JOSEPH T. VAIL,
FRED R. DUNCAN.